United States Patent [19]

Chopra

[11] 4,057,494
[45] *Nov. 8, 1977

[54] REMOVAL OF CHROMIUM, CHROMATE, MOLYBDATE AND ZINC

[75] Inventor: Randhir C. Chopra, Knoxville, Tenn.

[73] Assignee: Chemical Separations Corporation, Oak Ridge, Tenn.

[*] Notice: The portion of the term of this patent subsequent to Aug. 3, 1993, has been disclaimed.

[21] Appl. No.: 705,171

[22] Filed: July 14, 1976

Related U.S. Application Data

[63] Continuation-in-part of Ser. No. 488,630, July 15, 1974, Pat. No. 3,972,810.

[51] Int. Cl.² .................. B01D 15/02; C02B 1/42; C02B 1/56
[52] U.S. Cl. .................. 210/33; 210/37 B; 210/38 B
[58] Field of Search ............ 210/30 R, 32, 33, 37 B, 210/38 R, 38 A, 38 B, 38 C

[56] References Cited

U.S. PATENT DOCUMENTS

| | | | |
|---|---|---|---|
| 3,458,440 | 7/1969 | Schmidt | 210/32 |
| 3,501,401 | 3/1970 | Calmon | 210/38 R |
| 3,658,470 | 4/1972 | Zievers et al. | 210/37 B |
| 3,972,810 | 8/1976 | Chopra | 210/33 |

FOREIGN PATENT DOCUMENTS 798,326   7/1958   United Kingdom ............ 210/37

Primary Examiner—Wilbur L. Bascomb, Jr.
Assistant Examiner—Ivars Cintins
Attorney, Agent, or Firm—Cushman, Darby & Cushman

[57] ABSTRACT

Trivalent chromium, zinc, hexavalent chromate and molybdate can be removed from a fluid by contacting the fluid with an ion exchange resin bed comprising a mixture of a weak base anion exchange resin and a weak or strong acid cation exchange resin in hydrogen form to remove the metal values.

16 Claims, 1 Drawing Figure

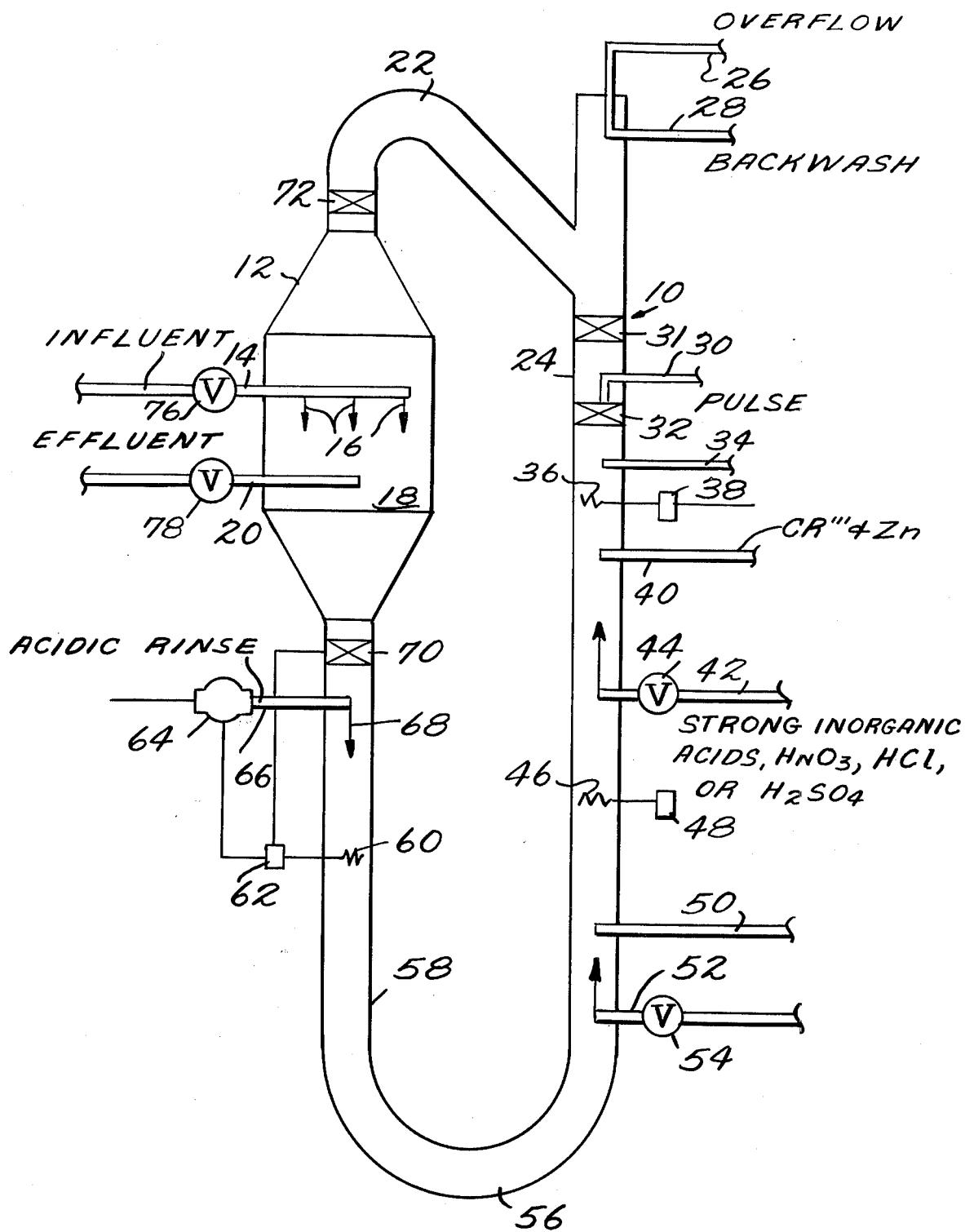

REMOVAL OF CHROMIUM, CHROMATE, MOLYBDATE AND ZINC

This application is a continuation-in-part of application Ser. No. 488,630, filed July 15, 1974, now U.S. Pat. No. 3,972,810.

BACKGROUND OF THE INVENTION

The continuous evaporation of fluid circulating through a cooling tower will precipitate increasing concentrations of dissolved solids in the unevaporated fluid. Eventually, as the fluid is continuously recycled back to the cooling tower, the concentration of the dissolved solids will become so high that the fluid will no longer be able to function as a coolant.

Typically, where the coolant is water, it is brought into the cooling tower at a temperature which may be as high as 180° F. or more, a large fraction, say one third of the water, is evaporated during each pass through the tower as the latent heat of evaporation of the remaining water is dissipated in the atmosphere. Since only water can evaporate and none of the dissolved solids which are present in it can evaporate, the concentration of the dissolved solids will increase as the water passes from the cooling tower to then serve as a coolant and then be recycled to the tower.

it is true that fresh water is added to make up for the water that is evaporated but the make-up water also contains dissolved solids so that gradually the concentration of the solids will rise to a level which will prevent the water from serving as an efficient coolant.

The solids which are objectionable and which must be removed include trivalent chromium, hexavalent chromate, molybdate and bivalent zinc. The chromium and zinc can be removed from solution by contacting the solution with a weak or strong acid cation exchange resin. The chromate and molybdate can be removed by contact with a weak base anion exchange resin in the presence of acid. Each of the resins requires a different regenerant so that the process will require bulky equipment due to the requirement for separate sites for the regeneration of the two resins. In the event that it is desired to remove only chromate and/or molybdate only the weak base anion exchange resin is necessary, but acid must be added to the solution if the chromate or molybdate is to be removed. Thus pollutant is removed but another pollutant is added to its solution.

The foregoing is one example where the present invention could be used. It could be used in other applications where it is desired to remove solids because they are pollutants or because they are valuable. Representative of such applications are those which involve the removal of molybdate values from mine tailings or the removal of contaminating hexavalent chromate values from cooling tower blowdown, especially where these contaminated waters do not contain any appreciable quantities of contaminating trivalent chromium and zinc values.

SUMMARY OF THE INVENTION

It is an object of the present invention to overcome drawbacks such as those set forth above. Accordingly, one embodiment of the present invention relates to the removal from a fluid of at least one of a first member selected from the group consisting of hexavalent chromium and molybdate, and at least one of a second member selected from the group consisting of trivalent chromium and zinc, by contacting said fluid with a mixture of a weak base anion exchange resin and a weak and/or strong acid cation exchange resin, regenerating said resin mixture with an inorganic acid and a hydroxide, and rinsing said regenerated resin bed mixture with an acidic rinse medium so that it can treat subsequent quantities of said fluid.

Another embodiment of the present invention relates to the removal from a fluid of hexavalent chromium and/or molybdate by contacting said fluid with a mixture of a weak base anion exchange resin and a weak or strong acid cation exchange resin, regenerating said resin mixture with an inorganic acid and a hydroxide, and rinsing said regenerated resin bed mixture with an acidic rinse medium so that it can treat subsequent quantities of said fluid.

The drawing is a schematic view of an apparatus for use in one embodiment of the present invention.

The apparatus indicated generally as 10 includes a treatment vessel 12 to which is fed influent through a line 14. The influent can be water to be treated for recirculation through a cooling tower or other water such as mine tailings. In the embodiment shown, the influent contains water and at least one of hexavalent chromium and/or molybdate, and at least one of trivalent chromium and/or zinc. The influent is distributed within the vessel 12 and directed downwardly as at 16. Within the vessel 12 is a mixture 18 of weak base anion exchange resin and weak and/or strong acid cation exchange resin. The weak base anion exchange resin can, for example, be a resin distributed under one of the following trademarks: Dowex MWA-1, IRA-93 or Dowlite ES-308. The weak acid cation exchange resin can be, for example, a resin distributed under one of the following trademarks: Dowex CCR-2 or Rohm & Haas XE-318 or Dowlite CC-3. The strong acid cation exchange resin can be, for example, a resin distributed under one of the following trademarks: Dow HCR, IR-120, Dowlite C-200r, Dow MSC-1, IR200 or Dowlite ES-26.

When the influent solution is contacted with the mixture of resins, the chromium and zinc ions, if present, are sorbed by the weak and/or strong acid cation exchange resin, whereas the chromate or molybdate ions are sorbed by the weak base anion exchange resin. Chromate and molybdate are sorbed on the weak base anion exchange resin even when the solution is not acidic because the weak and/or strong acid cation exchange resin will supply hydrogen ions. This allows the formation of chromic or molybdic acid which will sorb on the weak base anion resin. The reaction is believed to be as follows:

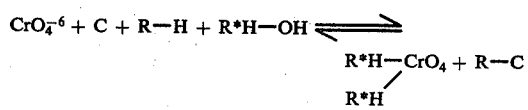

where R stands for weak or strong acid cation exchange resin; R*H stands for weak base anion exchange resin; and C stands for the cation ions such as $Cr^{+3}$, $Zn^{+2}$, or $NA^+$ or

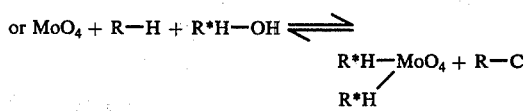

This mixture of ion exchange resins can be 25% by volume of the weak and/or strong acid cation exchange resin and 75% by volume of the weak base anion exchange resin. It has been found, however, that the mixture of resins will not function efficiently if either of the resins is less than 20% by volume of the total volume of the resin mixture.

The treatment section 12 is rather conventional in concept and design and will therefore not be described in any detail here. Basically, the resin is moved upward through the treatment vessel 12 periodically so that spent resin will be taken upwardly beyond the stream of solution which flows downward through its vessel 12 from the distributors 16 to an effluent line 20.

In passing from the distributors 16 to the effluent line 20 the solution loses its pollutants to the resin mixture so that the fluid which enters the effluent line 20 is free of pollutants. The portion of the mixture 18 which is above the distributors 16 is spent resins that is, resins which can no longer sorb the pollutants present in the influent. This periodic movement of the resin mixture is possible because the mixture is always suspended in liquid and because the resins are made to intermittently move in a generally clockwise direction, as shown in the drawing. Thus, the spent resins move up through an exhaust duct 22 which connects with a straight vertical section 24 which extends generally parallel to the treatment vessel 12. The vertical section 24 extends upward to a level higher than the treatment vessel 12 and to an overflow line 26 for backwash and pulse waters as well as any resin fines. The overflow line 26 can lead to a disposal unit or resin recovery system not shown. Backwash enters the vertical section 24 through a backwash line 28 which enters the column 24 below the overflow line 26.

In order to provide for the presence of regenerated resin within the treatment vessel 12 and for the regeneration of the resin, it is necessary to move resin as previously mentioned. To this end the pulse line 30 is connected to the vertical section 24 at a location between resin valves 31 and 32 so that when water is fed under pressure through the pulse line 30, it will impel the resin mixture within the vertical section 24 downward when the resin valve 32 is opened and the valve 31 is closed. The excess water introduced at the pulse line is substantially removed through a slip line 34.

Below the slit line 34 is a sensing element 36 which is connected to the interface sensor 38. Below the sensing element 36 is an anion relief line 40 and below the anion relief line 40 is an acid line 42 having a valve 44. When the valve 44 is opened, acid such as nitric, hydrochloric or sulfuric is led through the line 42 to react with the resins and to remove chromium or zinc ions. The following equations apply to the case where nitric acid is used:

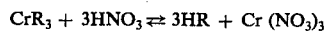

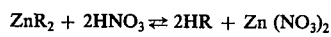

where R is a weak or strong acid cation exchange resin.

With the resin valve 32 closed and the valve 44 open, this reaction will take place until the sensing element 36 senses an absence of conductivity. When this happens, the valve 44 is closed automatically.

Below the acid line 42 is another sensing element 46 which is connected to an interface sensor 48. Below the sensing element 46 is a cation relief line 50 which is connected to the vertical section 24 and below the cation relief line 50 is the hydroxide line 52 in which is placed a valve 54 and which is connected to the vertical section 24.

The valve 54 is automatically opened to allow hydroxide such as ammonium hydroxide or potassium hydroxide to flow into the vertical section 24 and react it with the resins. The result is the formation of a metal chromate and/or metal molybdate which can flow out through the cation relief line 50 until such time that the sensing element 46 senses a pH corresponding to a substantial increase of pH to indicate the regeneration of anion resin. At such time the valve 54 is closed.

When sodium hydroxide is used, and chromate is on the resins, the chromate which leaves through the line 50 will be in the form of sodium chromate whereas when molybdate is present the molybdate which would leave through the line 50 would be sodium molybdate. When potassium hydroxide is used, and chromate is on the resins, the chromate which leaves through the cation relief line 50 will be in the form of potassium chromate and similarly, when molybdate is present, the molybdate which leaves through the cation relief line 50 will be in the form of potassium molybdate.

The bottom of the vertical section 24 merges with a curved section 56 which connects the vertical section 24 with a resin intake section 58 which extends parallel to the vertical section 24. The resin intake section 58 connects the curved end section 56 with the bottom of the treatment vessel 12. A sensing element 60 which is electrically connected to a conductivity or appropriate interface sensor 62 is positioned in the intake section 58. The sensor 62 is electrically connected to a valve 64 which is in a rinse line 66 which is positioned to carry acidic rinse water into the resin intake section 58 above the sensing element 60 when the valve 64 is opened. The sensor 62 is also connected electrically to a resin valve 70 which is placed in the resin intake section 58 immediately below the treatment vessel 12. When resin is moving upwardly through the resin intake section 58 and contaminants are present, the sensing element 60 sends an electric signal to the sensor 62 which sends out signals which close the resin valve 70 and which open the valve 64 so that the acidic rinse water which preferably has a pH ranging from about 1 to 4 flows through the line 66 to wash down the pollutants. When the sensing element 60 no longer sends out signals indicating the presence of pollutants the sensor 62 signals to close the valve 64 and open the resin valve 70. This allows the pulse water coming through the line 30 to move regenerated resin upward and into the treatment vessel 12. Upward movement of the spent resin is permitted because a resin valve 72 in the exhaust duct 22 immediately above the treatment vessel 12 is opened to permit upward movement of resin within the treatment vessel 12.

When influent coming into the line 14 is treated, resin valves 72 and 70 are closed so that no influent can contact resin anywhere except within the treatment vessel 12.

In operation, a pulse cycle is performed periodically to move the spent resin out of the treatment vessel 12 and to move regenerated resin into the vessel 12. This is accomplished by closing valves 76 and 78 in the influent line 14 and effluent line 20 respectively, by closing resin valve 31 and valves 44 and 54, opening the resin valve 32, 70 and 72 and directing water under pressure through the pulse line 30. This cycle has a period long enough to evacuate the space in the vertical section 24 between the resin valves 31 and 32 of resin. This will move regenerated and pollutant-free resin upward and into the treatment vessel 12 while spent resin will move out of the treatment vessel 12 and into the exhaust duct 22. After the valves 32, 70 and 72 have been opened for the predetermined period of time, they are closed and valve 31 is opened to start a treatment cycle. Valves 44 and 54 are opened in order to bring the regenerants into the vertical section 24. After the sensing elements 36 and 46 indicate that there is an absence of both cations and anions, the valves 44, 54 and 64 are closed as is the valve 31. Thereafter, the valves 32, 70 and 72 are opened and water is allowed to enter pulse line 30 to once again move resin through the apparatus 10 and being another pulse cycle.

It should be remembered that if pollutants, regenerants or other contaminants are present at the sensing element 60 at any time, the resin valve 70 will close and the valve 64 is opened to bring in acidic rinse water below the resin valve 70 until such time that the sensing element 60 signals that the resin in its vicinity is free of contaminants. This will assure that only completely regenerated and rinsed resin and especially strong or weak cation resin in the hydrogen ion form will move upward and into the vessel 12.

Although the drawing shows an apparatus for carrying out a continuous feed process for removing from an influent at least one of a first member selected from hexavalent chromium or molybdate and at least one of a second member selected from trivalent chromium and zinc, essentially the same apparatus and principles are employed to remove from an influent hexavalent chromium or molybdate in the absence of trivalent chromium and/or zinc. Further, in addition to the apparatus shown in the drawing, other apparatus such as a fixed bed type of resin exchanger can be used to carry out these various contaminant metal removal operations.

Thus, in such a fixed bed system the influent water containing said first and second members or an influent water containing hexavalent chromium and/or molybdate in the substantial or complete absence of contaminating trivalent chromium and/or zinc values, entrained therein is introduced into an ion exchange vessel containing a fixed ion exchange resin bed and the influent water is caused to flow therethrough. The ion exchange resin bed, as before, is a mixture of weak base anion exchange resin, and weak and/or strong acid cation exchange resin in hydrogen ion form, at the outset of the process. The amount of each type resin present in said mixture is at least 20% by volume of the total volume of the resin mixture; the weak and/or strong acid cation exchange resin being present in an amount sufficient to supply sufficient hydrogen ions so that the hexavalent chromium and/or molybdate are transferred from the influent water to the weak base ion exchange resin even when the influent water is not acidic so that not only is the hexavalent chromium and/or molybdate transferred to the weak base ion exchange resin but also the trivalent chromium and/or zinc or other contaminating cations such as the alkaline earth metals including particularly calcium and magnesium, and alkali metals including particularly sodium, which are generally present in those waters being treated which contain hexavalent chromium and/or molybdate values but not necessarily trivalent chromium or zinc values are transferred to the weak and/or strong cation exchange resin. The resulting water having substantially reduced amounts of hexavalent chromium and/or molybdate, and trivalent chromium and/or zinc or other contaminating cations as defined above are then withdrawn from the ion exchange vessel.

Thereafter, the introduction of the influent water to the ion exchange vessel is discontinued and a first regenerating agent is introduced therein for contact with the fixed resin bed mixture loaded with the contaminant cations and anions. Thereafter the introduction of the first regenerating agent is discontinued and there is withdrawn from the ion exchange vessel the first regenerating agent containing one of said contaminant cations or anions.

Thereafter a second regenerating agent is introduced into the ion exchange vessel for contact with the previously treated fixed ion exchange resin bed mixture. Then, the introduction of this second regenerating agent is discontinued and there is withdrawn from the ion exchange vessel and second regenerating agent containing the other of the said contaminant cations and anions.

An acidic rinse medium which can, preferably, have a pH ranging from about 1 to 4, is then introduced into the ion exchange resin to remove any residual contaminants and the thus spent acidic rinse medium is withdrawn leaving a rinsed and regenerated resin bed mixture wherein the weak and/or strong cation resin is in hydrogen form ready for further contact with the contaminated influent water.

The following examples illustrate the present invention. In each example the pH of the feed water was 6 or greater. Unless otherwise specified all parts and percentages are by weight.

EXAMPLE 1

A feed water was analyzed and found to have 20 p.p.m. $CrO_4$ and 5 p.p.m. Zn and also the following components:

|  | Ca | 800 p.p.m. |
|---|---|---|
|  | Mg | 90 p.p.m. |
|  | Na | 200 p.p.m. |
| Total Cation |  | 1090 p.p.m. as Calcium Carbonate |
|  | $SO_4$ | 900 p.p.m. |
|  | Cl | 190 p.p.m. |
| Total Anions |  | 1090 p.p.m. as Calcium Carbonate |

The feed was introduced into an ion exchange vessel containing a fixed bed of resin which consisted of 75% by volume of weak base anion exchange resin and 25% by volume of weak acid cation exchange resin. The effluent was analyzed and found to contain less than 0.05 p.p.m. of $CrO_4$. The resin bed was initially regenerated with a 2% by weight $H_2SO_4$ solution, and then with a 5% by weight NaOH solution. Thereafter the regenerated resin bed was rinsed with an aqueous acidic rinse medium and was thus ready for further contact with additional amounts of said feed water.

EXAMPLE 2

A feed water to be treated was found to have the following analysis:
$NH_3$: 1,000 p.p.m. as $CaCO_3$
$NO_3$: 1,000 p.p.m. as $CaCO_3$
$CrO_4$: 6 p.p.m.

The feed water was introduced into a fixed bed resin exchanger having 75% by volume of a weak base anion exchange resin and 25% by volume of a weak acid cation exchange resin. The effluent was analyzed and found to contain less than 0.05 p.p.m. of $CrO_4$.

The resin was then initially regenerated with a 2% by weight $HNO_3$ solution and then with a 5% NaOH solution.

Thereafter the regenerated resin bed was rinsed with an aqueous acidic rinse medium and was ready for further contact with additional amounts of said feed water.

Example 2 is repeated with essentially similar results except that the weak acid cation exchange resin is replaced by an equal volume of strong acid cation exchange resin.

EXAMPLE 3

A feed water to be treated had the following analysis:
50 p.p.m.: $CrO_4$
42 p.p.m.: $Cr^{+3}$
41.8 p.p.m.: Zn The resin used was the same mixture as in Examples 1 and 2. The fixed bed of resin was regenerated initially with a 2% by weight $HNO_3$ solution and then with a 5% by weight NaOH solution, and thereafter the requested resin bed was rinsed as indicated in Example 2.

The treated water was found to contain 16 p.p.m. $Cr^{+3}$ and no detectable Zn or $CrO_4$.

EXAMPLE 4

Feed water and regenerants and aqueous acidic rinse medium having the same analysis as those of Example 3 when used in conjunction with a resin mixture having the same proportions as that of Example 3 resulted in treated water having the following analysis:
No detectable $Cr^{+3}$
No detectable $CrO_4$
0.36 p.p.m. Zn

EXAMPLE 5

Feed water was treated with the resin mixture of Examples 3 and 4 in the continuous ion exchange apparatus set forth in the specification and drawing.

The feed water had the following analysis:
$CrO_4$: 20–1000 p.p.m.
Zn: 5–95 p.p.m.
Cr: 10–100 p.p.m.

The treated water had the following analysis:
$CrO_4$: 00.05 p.p.m.
Zn: 00.1 p.p.m.
Cr: 00.05 p.p.m.

Example 5 is repeated, with essentially the same results, except that the weak acid cation exchange resin is replaced by an equal volume of strong acid cation exchange resin.

What is claimed is:

1. A continuous cyclic process for removing from influent water at least one of a first member selected from the group consisting of hexavalent chromium and molybdate, and at least one of a second member selected from the group consisting of trivalent chromium and zinc comprising:
    1. introducing said water containing said first and second members entrained therein into the upper portion of a first section of an ion exchange vessel having a shiftable ion exchange resin bed therein and causing said water to flow downwardly through said ion exchange resin bed consisting essentially of a mixture of weak base anion exchange resin and weak acid cation exchange resin in hydrogen ion form, wherein each type resin is present in said mixture in an amount of at least 20% by volume of the total volume of said resin mixture and wherein said weak acid cation exchange resin is present in an amount sufficient to supply sufficient hydrogen ions so that said first member is transferred from said water to said weak base anion exchange resin even when said influent water is not acidic, whereby said first and second members are transferred, respectively, to said weak base anion exchange resin and to said weak acid cation exchange resin;
    2. withdrawing from the lower portion of said first section the resulting water with substantially reduced amounts of said first and second members;
    3. introducing a first regenerating agent into one portion of a second portion of said ion exchange vessel containing said mixture of weak base anion exchange resin loaded with said first member and weak acid cation exchange resin loaded with said second member, from (1) and causing said first regenerating agent to contact said ion exchange resin mixture;
    4. withdrawing from said one portion of said second section said first regenerating agent containing one of said first and second members,
    5. essentially simultaneous with the introduction of said first regenerating agent in (3) introducing a second regenerating agent into another portion of said second section of said ion exchange vessel containing said mixture of weak base anion exchange resin and weak acid cation exchange resin previously treated in (3) and causing said second regenerating agent to contact said ion exchange resin mixture;
    6. withdrawing from said another portion of said second section said second regenerating agent containing the other of said first and second members;
    7. transferring ion exchange resin regenerated at (5) in said second section and introducing the same into the lower portion of said first section for contact with water containing said first and second members, thereby displacing ion exchange resin loaded with said first and second members from the upper portion of said first section;
    8. transferring said ion exchange resin loaded with said first and second members and displaced from the upper portion of said first section to another section of said ion exchange vessel communicating therewith, thereby displacing another portion of said ion exchange resin loaded with said first and second members from said another section;
    9. transferring said another portion of said ion exchange resin loaded with said first and second members and displaced from said another section to said one portion of said second section for regeneration therein;
    10. detecting the presence of contaminants in the ion exchange resin bed being transferred between the said second section and said first section and in response thereto introducing aqueous acidic resin rinse medium into said ion exchange vessel intermediate said first and second section in a direction counter-current to the transfer of said resin thereby establishing the introduction of substantially contaminant-free ion exchange resin into said first section.
2. The process of claim 1 which includes:
    interrupting (a) the flow of water containing said first and second members in (1), and (b) the withdrawal of water which is substantially free of said first and second member in (2) and the flow of first and second regenerating agents in (3) and (5), respectively, in said second section of said ion exchange vessel and introducing ion exchange resin pulse medium into an ion exchange resin pulse section, the outlet of said ion exchange resin pulse section communicating with the upper portion of said one portion of said second section of said ion exchange vessel and the inlet of said ion exchange resin pulse section communicating with the upper portion of said first section whereby ion exchange resin in said vessel is shifted from one section thereof to another contiguous section therein, thereby introducing into the said one portion of said second section ion exchange resin loaded with said first and second members previously eliminated from the influent water for regeneration thereof by said first regenerating agent, whereby in turn ion exchange resin regenerated in said one portion of said second section is displaced therefrom, thereby causing the introduction into said another portion of said second section ion exchange resin previously regenerated in said one portion of said second section, and whereby in turn ion exchange resin regenerated in said another portion of said second section is displaced therefrom, thereby causing the introduction into the lower portion of said first section ion exchange resin regenerated in said another portion of said second section, and whereby, in turn, ion exchange resin in the upper portion of said first section is displaced therefrom.

3. A continuous cyclic process for removing from influent water at least one of a first member selected from the group consisting of hexavalent chromium and molydbate, and at least one of a second member selected from the group consisting of trivalent chromium and zinc comprising:
1. introducing said water containing said first and second members entrained therein into the upper portion of a first section of an ion exchange vessel having a shiftable ion exchange resin bed therein and causing said water to flow downwardly through said ion exchange resin bed consisting essentially of a mixture of weak base anion exchange resin and strong acid cation exchange resin in hydrogen ion form, wherein each type resin is present in said mixture in an amount of at least 20% by volume of the total volume of said resin mixture and wherein said strong acid cation exchange resin is present in an amount sufficient to supply sufficient hydrogen ions so that said first member is transferred from said water to said weak base anion exchange resin even when said influent water is not acidic, whereby said first and second members are transferred, respectively, to said weak base anion exchange resin and to said strong acid cation exchange resin;
2. withdrawing from the lower portion of said first section the resulting water with substantially reduced amounts of said first and second members;
3. introducing a first regenerating agent into one portion of a second section of said ion exchange vessel containing said mixture of weak base anion exchange resin loaded with said first member and strong acid cation exchange resin loaded with said second member, from (1) and causing said first regenerating agent to contact said ion exchange resin mixture;
4. withdrawing from said one portion of said second section, said first regenerating agent containing one of said first and second members,
5. essentially simultaneous with the introduction of said first regenerating agent in (3) introducing a second regenerating agent into another portion of said second section of said ion exchange vessel containing said mixture of weak base anion exchange resin and strong acid cation exchange resin previously treated in (3) and causing said second regenerating agent to contact said ion exchange resin mixture;
6. withdrawing from said another portion of said second section said second regenerating agent containing the other of said first and second members;
7. transferring ion exchange resin regenerated at (5) in said second section and introducing the same into the lower portion of said first section for contact with water containing said first and second members, thereby displacing ion exchange resin loaded with said first and second members from the upper portion of said first section;
8. transferring said ion exchange resin loaded with said first and second members and displaced from the upper portion of said first section to another section of said ion exchange vessel communicating therewith, thereby displacing another portion of said ion exchange resin loaded with said first and second members from said another section;
9. transferring said another portion of said ion exchange resin loaded with said first and second members and displaced from said another section to said one portion of said second section for regeneration therein;
10. detecting the presence of contaminants in the ion exchange resin bed being transferred between the said second section and said first section and in response thereto introducing aqueous acidic resin rinse medium into said ion exchange vessel intermediate said first and second sections in a direction countercurrent to the transfer of said resin thereby establishing the introduction of substantially contaminant-free ion exchange resin into said first section.

4. The process of claim 3 which includes:
interrupting (a) the flow of water containing said first and second members in (1), and (b) the withdrawal of water which is substantially free of said first and second members in (2) and the flow of first and second regenerating agents in (3) and (5), respectively, in said second section of said ion exchange vessel and introducing ion exchange resin pulse medium into an ion exchange resin pulse section, the outlet of said ion exchange resin pulse section communicating with the upper portion of said one portion of said second section of said ion exchange vessel and the inlet of said ion exchange resin pulse section communicating with the upper portion of said first section whereby ion exchange resin in said vessel is shifted from one section thereof to another contiguous section therein, thereby introducing into the said one portion of said second section ion exchange resin loaded with said first and second members previously eliminated from the influent water for regeneration thereof by said first regenerating agent, whereby in turn ion exchange resin regenerated in said one portion of said second section is displaced therefrom, thereby causing the introduction into said another portion of said second section ion exchange resin previously regenerated in said one portion of said second section, and whereby in turn ion exchange resin regenerated in said another portion of said second section is displaced therefrom, thereby causing the introduction into the lower portion of said first section ion exchange resin regenerated in said another portion of said second section, and whereby, in turn, ion exchange resin in the upper portion of said first section is displaced therefrom.

5. A continuous cyclic process for removing from influent water contaminants comprising at least one of a member selected from the group consisting of hexavalent chromium and molybdate and at least one contaminating cation comprising 1. introducing said water containing said contaminants entrained therein into the upper portion of a first section of an ion exchange vessel having a shiftable ion exchange resin bed therein and causing said water to flow downwardly through said ion exchange resin bed consisting essentially of a mixture of weak base anion exchange resin and an acid cation exchange resin in hydrogen ion form, wherein each type resin is present in said mixture in an amount of at least 20% by volume of the total volume of said resin mixture and wherein said acid cation exchange resin is present in an amount sufficient to supply sufficient hydrogen ions so that said member is transferred from said water to said weak base anion exchange resin even when said influent water is not acidic, whereby said member and said contaminating cation are transferred respectively to said weak base anion exchange resin and to said acid cation exchange resin;
2. withdrawing from the lower portion of said first section the resulting water with substantially reduced amounts of said contaminants;
3. introducing a first regenerating agent into one portion of a second section of said ion exchange vessel containing said mixture of weak base anion exchange resin loaded with said member and acid cation exchange resin loaded with said contaminating cation from (1) and causing said first regenerating agent to contact said ion exchange resin mixture;
4. withdrawing from said one portion of said second section said first regenerating agent containing one of said member and said contaminating cation;
5. essentially simultaneous with the introduction of said first regenerating agent in (3) introducing a second regenerating agent into another portion of said second section of said ion exchange vessel containing said mixture of weak base anion exchange resin and acid cation exchange resin previously treated in (3) and causing said second regenerating agent to contact said ion exchange resin mixture;
6. withdrawing from said another portion of said second section said second regenerating agent containing the other of said member and said contaminating cation;
7. transferring ion exchange resin regenerated at (5) in said second section and introducing the same into the lower portion of said first section for contact with water containing said contaminants, thereby displacing ion exchange resin loaded with said contaminants from the upper portion of said first section;
8. transferring said ion exchange resin loaded with said contaminants and displaced from the upper portion of said first section to another section of said ion exchange vessel communicating therewith, thereby displacing another portion of said ion exchange resin loaded with said contaminants from said another section;
9. transferring said another portion of said ion exchange resin loaded with said contaminants and displaced from said another section to said one portion of said second section for regeneration therein;
10. detecting the presence of contaminants in the ion exchange resin bed being transferred between the said second section and said first section and in response thereto introducing aqueous acidic resin rinse medium into said ion exchange vessel intermediate said first and second section in a direction countercurrent to the transfer of said resin thereby establishing the introduction of substantially contaminant-free ion exchange resin into said first section.

6. The process of claim 5 wherein said contaminant member is hexavalent chromate.

7. The process of claim 5 wherein said contaminant member is molybdate.

8. The process of claim 5 wherein said acid cation exchange resin is a weak acid cation exchange resin.

9. The process of claim 5 wherein said acid cation exchange resin is a strong acid cation exchange resin.

10. A process for removing from influent water at least one of a first member selected from the group consisting of hexavalent chromium and molybdate, and at least one of a second member selected from the group consisting of trivalent chromium and zinc comprising 1. introducing said water containing said first and second members entrained therein into an ion exchange vessel containing a fixed ion exchange resin bed and causing said water to flow through said ion exchange resin bed consisting essentially of a mixture of weak base anion exchange resin and weak acid cation exchange resin in hydrogen ion form wherein each type resin is present in said mixture in an amount of at least 20% by volume of the total volume of said resin mixture and wherein said weak acid cation exchange resin is present in an amount sufficient to supply sufficient hydrogen ions so that said first member is transferred from said water to said weak base ion exchange resin even when said influent water is not acidic, whereby said first and second members are transferred respectively, to said weak base anion exchange resin and to said weak acid cation exchange resin;
2. withdrawing from said ion exchange vessel the resulting water with substantially reduced amounts of said first and second members;
3. discontinuing the introduction of said influent water into said ion exchange vessel;
4. introducing a first regenerating agent into said ion exchange vessel containing said mixture of weak base anion exchange resin loaded with said first member and weak acid cation exchange resin loaded with said second member and causing said first regenerating agent to contact said fixed ion exchange resin bed mixture;

5. discontinuing the introduction of said first regenerating agent into said ion exchange vessel and withdrawing from said ion exchange vessel said first regenerating agent containing one of said first and second members;

6. introducing a second regenerating agent into said ion exchange vessel containing said mixture of weak base anion exchange resin and weak acid cation exchange resin previously treated in (4) and causing said second regenerating agent to contact said fixed ion exchange resin bed mixture;

7. discontinuing the introduction of said second regenerating agent into said ion exchange vessel and withdrawing from said ion exchange vessel said second regenerating agent containing the other of said first and second members;

8. introducing aqueous acidic resin rinse medium into said ion exchange vessel and 9. withdrawing from said ion exchange vessel spent rinse medium thereby providing in said ion exchange vessel said fixed ion exchange resin bed rinsed and regenerated and ready for further contact with said influent water.

11. A process for removing from influent water at least one of a first member selected from the group consisting of hexavalent chromium and molybdate, and at least one of a second member selected from the group consisting of trivalent chromium and zinc comprising 1. introducing said water containing said first and second members entrained therein into an ion exchange vessel containing a fixed ion exchange resin bed and causing said water to flow through said ion exchange resin bed consisting essentially of a mixture of weak base anion exchange resin and strong acid cation exchange resin in hydrogen ion form wherein each type of resin is present in said mixture in an amount of at least 20% by volume of the total volume of said resin mixture and wherein said strong acid cation exchange resin is present in an amount sufficient to supply sufficient hydrogen ions so that said first member is transferred from said water to said weak base ion exchange resin even when said influent water is not acidic, whereby said first and second members are transferred respectively, to said weak base anion exchange resin and to said strong acid cation exchange resin;

2. withdrawing from said ion exchange vessel the resulting water with substantially reduced amounts of said first and second members;

3. discontinuing the introduction of said influent water into said ion exchange vessel;

4. introducing a first regenerating agent into said ion exchange vessel containing said mixture of weak base anion exchange resin loaded with said first member and strong acid cation exchange resin loaded with said second member and causing said first regenerating agent to contact said fixed ion exchange resin bed mixture;

5. discontinuing the introduction of said first regenerating agent into said ion exchange vessel and withdrawing from said ion exchange vessel said first regenerating agent containing one of said first and second members;

6. introducing a second regenerating agent into said ion exchange vessel containing said mixture of weak base anion exchange resin and strong acid cation exchange resin previously treated in (4) and causing said second regenerating agent to contact said fixed ion exchange resin bed therein;

7. discontinuing the introduction of said second regenerating agent into said ion exchange vessel and withdrawing from said ion exchange vessel said second regenerating agent containing the other of said first and second members;

8. introducing aqueous acidic resin rinse medium into said ion exchange vessel and 9. withdrawing from said ion exchange vessel spent rinse medium thereby providing in said ion exchange vessel said fixed ion exchange resin bed, rinsed and regenerated and ready for further contact with said influent water.

12. A process for removing from influent water contaminants comprising at least one of a member selected from the group consisting of hexavalent chromium and molybdate, and at least one contaminating cation comprising 1. introducing said water containing said contaminants entrained therein into an ion exchange vessel containing a fixed ion exchange resin bed and causing said water to flow through said ion exchange resin bed consisting essentially of a mixture of weak base anion exchange resin and an acid cation exchange resin in hydrogen ion form wherein each type resin is present in said mixture in an amount of at least 20% by volume of the total volume of said resin mixture and wherein said acid cation exchange resin is present in an amount sufficient to supply sufficient hydrogen ions so that said member is transferred from said water to said weak base ion exchange resin even when said influent water is not acidic, whereby said member and said contaminating cation are transferred respectively, to said weak base anion exchange resin and to said acid cation exchange resin;

2. withdrawing from said ion exchange vessel the resulting water with substantially reduced amounts of said contaminants;

3. discontinuing the introduction of said influent water into said ion exchange vessel;

4. introducing a first regenerating agent into said ion exchange vessel containing said mixture of weak base anion exchange resin loaded with said member and acid cation exchange resin loaded with said contaminating cation and causing said first regenerating agent to contact said fixed ion exchange resin bed mixture;

5. discontinuing the introduction of said first regenerating agent into said ion exchange vessel and withdrawing from said ion exchange vessel said first regenerating agent containing one of said member and said contaminating cation;

6. introducing a second regenerating agent into said ion exchange vessel containing said mixture of weak base anion exchange resin and acid cation exchange resin previously treated in (4) and causing said second regenerating agent to contact said fixed ion exchange resin bed mixture;

7. discontinuing the introduction of said second regenerating agent into said ion exchange vessel and withdrawing from said ion exchange vessel said second regenerating agent containing the other of said member and said contaminating cation;

8. introducing aqueous acidic resin rinse medium into said ion exchange vessel and
9. withdrawing from said ion exchange vessel spent rinse medium thereby providing in said ion exchange vessel said fixed ion exchange resin bed rinsed and regenerated and ready for further contact with said influent water.

13. The process of claim 12 wherein said contaminant member is hexavalent chromium.
14. The process of claim 12 wherein said contaminant member is molybdate.
15. The process of claim 12 wherein said acid cation exchange resin is a weak acid cation exchange resin.
16. The process of claim 12 wherein said acid cation exchange resin is a strong acid cation exchange resin.

* * * * *